United States Patent
Ourchane et al.

(10) Patent No.: US 6,513,860 B1
(45) Date of Patent: Feb. 4, 2003

(54) METHOD AND APPARATUS FOR FORMING A THREE PIECE TAILOR WELDED DOOR BLANK

(75) Inventors: Amar Ourchane, Dearborn, MI (US); Ching-Hung Chuang, Novi, MI (US); Ronald Machin, Ann Arbor, MI (US); Scott Crane, Farmington Hills, MI (US); Xiao Wu, Canton, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/558,776

(22) Filed: Apr. 26, 2000

(51) Int. Cl.[7] .............................................. B62D 25/04
(52) U.S. Cl. .................................................. 296/146.5
(58) Field of Search ........................ 296/146.5, 146.1; 49/502

(56) References Cited

U.S. PATENT DOCUMENTS

| | | |
|---|---|---|
| 4,307,911 A | 12/1981 | Pavlik |
| 4,509,293 A | 4/1985 | Ufrecht |
| 4,766,660 A * | 8/1988 | La Rose |
| 4,917,433 A | 4/1990 | Tomforde |
| 5,272,841 A * | 12/1993 | Freeman et al. |
| 5,325,632 A | 7/1994 | Djavairian |
| 5,398,989 A | 3/1995 | Winter |
| 5,536,060 A | 7/1996 | Rashid |
| 5,787,645 A | 8/1998 | Heim |
| 5,819,473 A | 10/1998 | Hashimoto |
| 5,879,046 A | 3/1999 | Kalis, Jr. |
| 5,941,110 A | 8/1999 | Cao |
| 5,961,858 A * | 10/1999 | Britnell |
| 6,039,384 A * | 3/2000 | Schulte et al. |

* cited by examiner

*Primary Examiner*—D. Glenn Dayoan
*Assistant Examiner*—Scott Carpenter
(74) *Attorney, Agent, or Firm*—Damian Porcari

(57) ABSTRACT

A three-piece tailor welded blank vehicle door structure includes a periphery defined by a bottom portion, a pair of opposing side portions, a top portion, and an inclined portion. A first thickness gage sheet material portion is disposed generally along the door hinge side of the door structure. A second thicker gage sheet material portion is disposed generally along the door latch side of the door structure. A thinner gage sheet material portion is disposed between the first and second thickness gage sheet material portions, whereby the overall weight of the vehicle door is reduced.

20 Claims, 2 Drawing Sheets

METHOD AND APPARATUS FOR FORMING A THREE PIECE TAILOR WELDED DOOR BLANK

TECHNICAL FIELD

The present invention relates generally to tailor welded blank forming. More specifically, the present invention relates to the design of a vehicle door utilizing three-piece tailor welded blank forming.

BACKGROUND OF THE INVENTION

During the past two decades, governmental fuel conservation and safety mandates along with global competition and environmental concerns have prompted the automotive industry to design lighter vehicles for reduced fuel consumption and reduced manufacturing costs, while improving the overall structure of the vehicle for occupant safety.

A relatively new process known as tailor welded blank forming has been developed in an attempt to meet these needs. The tailor welded blank forming process replaces the traditional sequential forming then welding process with a sequential welding then forming process. The tailor welded blank forming process involves joining various metal sheet sections (e.g. steel sheets) having different properties, such as thickness, strength, etc., into a single welded blank for subsequent forming operations to a desired shape. Therefore, optimum material properties can be located precisely within the formed part where needed for particular applications.

For example, thicker and/or stronger sheet material is typically used at locations that previously required reinforcement parts. The potential benefits of the tailor welded blank forming process include fewer parts, fewer forming dies, fewer spot welds, less material input, and better utilization of sheet metal. Consequently, use of tailor welded forming processes will typically result in weight reduction, improved structural integrity, reduced scrap, lower manufacturing costs, and improved dimensional accuracy.

Tailor welded blank technology has recently been utilized in the automotive industry. Specifically, a few automotive manufacturers have recently started using two piece tailor welded blank forming for vehicle doors in place of the current conventional door forming process in order to provide a thicker structure at some of the more sensitive areas.

FIG. 1 is an illustration of a vehicle door constructed from known two-piece tailor welded blank (TWB) forming. The two-piece TWB vehicle door 10 includes a first side portion, a second side portion 14 opposing the first side portion 12, and a bottom side portion 16 connecting the bottom end 18 of the first side portion 12 to the bottom end 20 of the second side portion 14. The first side portion 12 has an upper end 22 opposing the lower end 18, with the upper end 22 being connected to an inclined upper portion 24. The inclined upper portion 24 is connected to a top side portion 26, which in turn is connected to the upper end 28 of the second side portion 14.

The vehicle door 10 has a first section 32 and a second section 34. The first section 32 is formed such that it encompasses the first side portion 12. The vehicle door hinges are attached to the door along the first side portion 12 and thus, this area of the door 10 is subjected to significant stress. In prior conventional designs, the area where the hinges 36 attached to the door was typically formed with reinforcing structures to provide additional strength characteristics to compensate for the stress to which the area is subjected. Accordingly, with known prior two-piece TWB designs, the first section 32 is constructed of a thicker gage material in order to reduce the need for reinforcing ribs or other structures to provide strength to the door area adjacent the hinges.

The second section 34, which is welded to the first section 32 prior to forming the door structure, is formed of a lighter gage material than the first section 32. The configuration of the two-piece TWB door design provides the necessary strength at the door hinge side of the door while at the same time reducing the weight of the overall door. This configuration while beneficial, still does not provide optimum performance in all areas.

SUMMARY OF THE INVENTION

It is an object of the present invention to provide a vehicle door structure formed from three-piece tailor welded blank forming that provides improved system performance in a variety of different measurable areas over prior vehicle door designs.

It is another object of the present invention to provide a vehicle door structure formed from three-piece tailor welded blank forming that provides decreased overall weight as compared to prior conventional vehicle door designs.

It is still another object of the present invention to provide a vehicle door structure formed from three-piece tailor welded blank-forming that provides reduced design cost as compared to prior conventional vehicle door designs.

In accordance with the above and other objects of the present invention, a vehicle door structure formed from three-piece tailor welded blank forming is provided. The vehicle door includes a bottom side portion and a pair of opposing generally vertical side portions. The first generally vertical side portion is located adjacent the door hinges. The second generally vertical side portion is located adjacent the door handle. The first generally vertical side portion has an upper portion that is attached to a generally inclined upper portion. The generally inclined upper portion is also attached to a top side portion, which is attached to an upper portion of the second vertical side portion. The vehicle door includes a panel portion which is generally defined by the bottom side portion, the first generally vertical side portion, the lower portion of the second generally vertical side portion, and a lower window frame portion.

The vehicle door has a first thicker gage portion that covers essentially all of the primary bone structure that results from the attachment and location of the door hinges. The vehicle door has a second thicker gage portion that covers essentially all of the primary bone structure that results from the attachment and location of the door latch. A thinner gage portion is disposed between the first thicker gage portion and the second thicker gage portion such that the overall weight of the door is reduced.

These and other features of the present invention will become apparent from the following description of the invention, when viewed in accordance with the accompanied drawings and appended claims.

DETAILED DESCRIPTION OF THE PREFERRED EMBODIMENT

Figure 2:
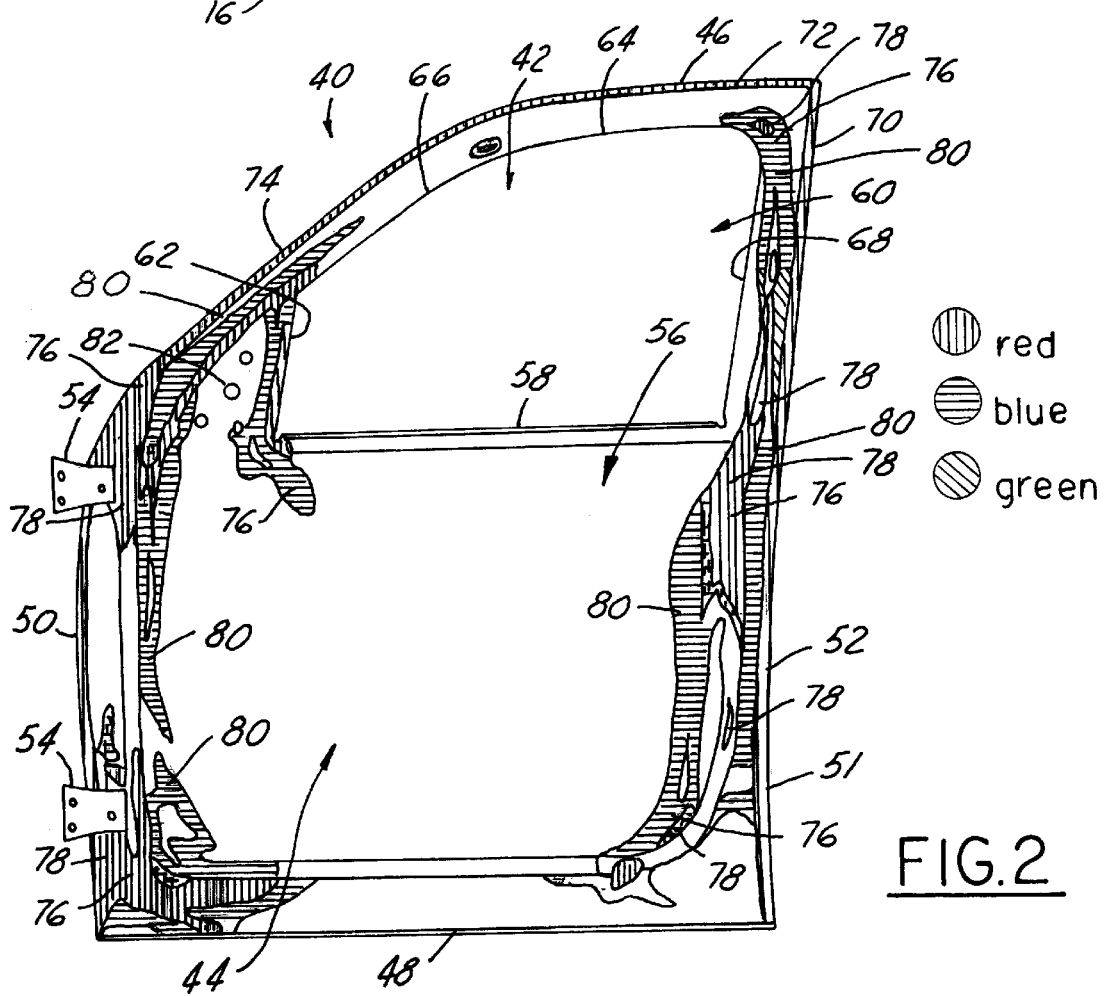
FIG. 2 is an illustration of a vehicle door primary bone structure in accordance with a preferred embodiment of the present invention.

FIG. 2 illustrates a vehicle door structure 40 in accordance with a preferred embodiment of the present invention. The vehicle door has an upper window portion 42, a lower panel portion 44, and an outer periphery 46, which extends generally around the entire vehicle door structure 40.

The lower panel portion 44 of the door structure 40 has a bottom portion 48 that is intended to extend generally parallel to the ground when the vehicle door structure 40 is attached to the vehicle. The lower panel portion 44 further includes a first generally vertical portion 50 and a lower end 51 of a second generally vertical portion 52. The first generally vertical portion 50 and the second generally vertical portion 52 extend generally upward from and generally perpendicular to the bottom portion 48. The first generally vertical portion 50 is preferably located on the side of the door structure 40 where the door hinges 54 are attached to the lower panel portion 44. The second generally vertical portion 52 is located opposite the first generally vertical portion 50. The lower panel portion 44 is bounded generally on its upper portion 56 by a lower frame portion 58.

The upper window portion 42 of the door structure 40 has a window opening 60. The window opening 60 is bounded by the lower frame portion 58, a first generally vertical side frame portion 62, an upper frame portion 64, a generally inclined side frame portion 66, and a second generally vertical side frame portion 68. The upper window portion 42 is generally defined by an upper end 70, of the second generally vertical side portion 52, a top portion 72, and a generally inclined side portion 74.

In accordance with the present invention, through experimentation, the areas of sensitivity or bone structures of the door structure 40 have been determined. The bone structure, 76 includes primary bone structures or primary areas of sensitivity, transition areas, and non-sensitive areas. As shown in FIG. 2, primary bone structures 78 are cross-hatched for the color red, while the transition areas 80 are cross-hatched for blue and green. The transition areas 80 are sensitive, but not as sensitive as the primary bone structures 78. The non-sensitive areas are the portions of the door structure in FIG. 2 that are not cross-hatched.

As shown in FIG. 2, it has been determined that the primary bone structures 78 exist along the first generally vertical portion 50, which is the side where the hinges 54 attach to the door structure 40, and the second generally vertical portion 52, which is the side where the door latch 81 is typically present. Further, the primary bone structures 78 also extend along the generally inclined side portion 74 and segments of the bottom portion 48. Moreover, the primary bone structures 78 also extend into the generally triangular area 82 defined by the first generally vertical side frame portion 62, and the upper portion 56 of the lower panel portion 44. The transition areas 80 exist in generally the same areas as the primary bone structures 78. However, the transition areas 80 also extend further generally inward away from the outer peripheral 46.

Figure 3:
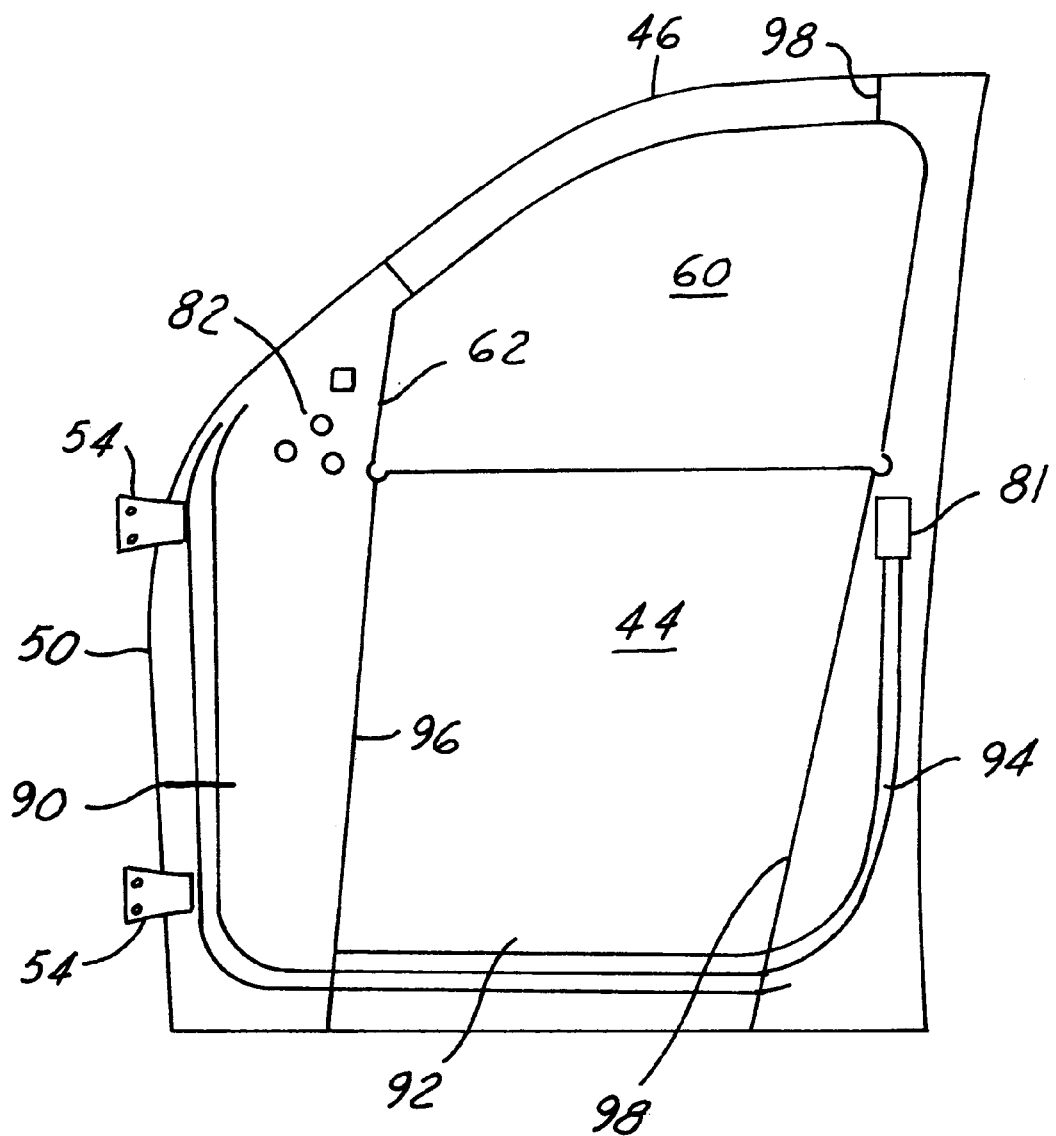
FIG. 3 is an illustration of a vehicle door formed from three-piece tailor welded blank forming in accordance with a preferred embodiment of the present invention.

Turning now to FIG. 3, a vehicle door structure 40 formed from three-piece, tailor-welded forming in accordance with the present invention is illustrated. The vehicle door structure 40 has a first portion 90, a second portion 92, and a third portion 94. The first portion 90 is constructed of a thicker gage sheet material and preferably extends from the bottom portion 48, upwardly along the first generally vertical portion 50, and covers a portion of the generally inclined side portion 74. The first portion 90 also preferably covers the generally triangular area 82. Thus, the first portion 90 is formed such that a thicker gage material covers most of the primary bone structure 78, shown in FIG. 2. The first portion 90 also covers most of the transition areas 80 adjacent the first generally vertical portion 50.

The first portion 90 is preferably positioned to cover most of the areas of sensitivity adjacent to the hinge side of the door by covering the entire first vertical side portion 50, the entire generally triangular area 82, a portion of the bottom portion 48, and a portion of the generally inclined side portion 74. The first portion 90 also preferably extends inwardly away from the outer periphery 46 of the vehicle door structure 40 such that it has an inner edge 96 that is disposed generally in line with a downward projection of the first vertical side frame portion 62. The areas of sensitivity 78, 80 located adjacent the hinge side of the door are due to the location, attachment, and usage of the door hinges 54.

The third portion 94 is also constructed of a thicker gage sheet material. The third portion 94 covers the entire second generally vertical side portion 68. The third portion 94 preferably extends from the bottom portion 48 all the way up to the top portion 72. The third portion 94 has an inner edge 98 that covers a portion of the top portion 72. The inner edge 98 also extends generally on an angle generally away from the outer periphery 46 as it extends from the lower frame portion 58 to the bottom portion 48. The third portion 94 thus covers most of the primary bone structures 78 and the transition areas 80 adjacent the second generally vertical portion 52. The areas of sensitivity 78, 80 located adjacent this side of the door are due to the location, attachment, and usage of the door hinge or handle.

The second portion 92 is disposed between the first portion 90 and the third portion 94, and is comprised of a lighter gage material as there are few areas of sensitivity on the second portion 92. The three-piece TWB uses a thick-thin-thick gage combination that covers most of the door bone structure 78, 80 and thus maximizes the performance of the door system. Thus, the overall weight of the door can be significantly reduced as the second portion 92, which comprises a majority of the material of the entire door, is made from a reduced weight material.

It should be understood that the first portion 90 and the third portion 94 can be configured in a variety of different ways to still provide the necessary strength and reduce the overall weight of the door. The disclosed vehicle door structure 40 is intended to be universal such that it can be used on most vehicle doors without major design changes.

Figure 1:
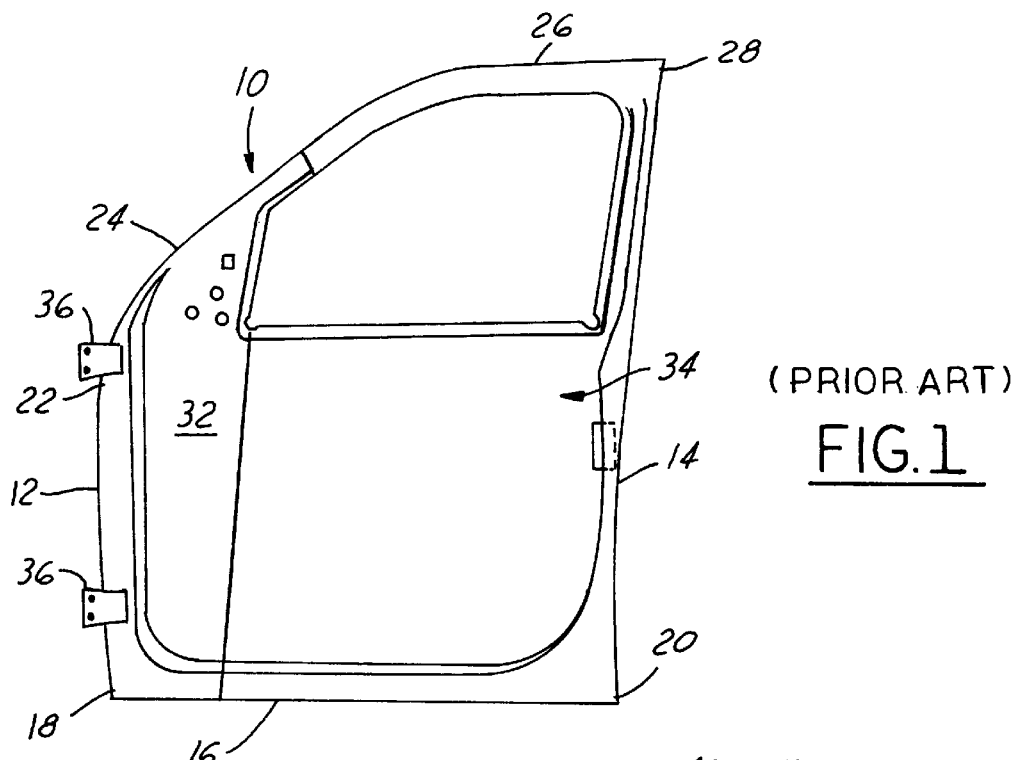
FIG. 1 is an illustration of a vehicle door formed from two-piece tailor welded blank forming in accordance with known prior art methods.

In designing the door structure 40, it is intended to meet several functional requirements which are intended to simulate the process and customer usage during the assembly and ingress/egress, and also to prevent seal pressure leak, noise and vibration, and water leak. The overall door system requirements that are met by the disclosed design are drop-off, sag, window frame rigidity front, window front rigidity rear, torsion rigidity at beltline, torsion rigidity at tip, and torsion rigidity at bottom. It has been determined that the primary bone structure of the overall door system is around the outer rim of the inner panel, including the hinge and latch areas, as shown in FIG. 2. Further, at the primary bone structure area, the door performance is very sensitive to the gage of the inner panel at that region. The prior two-piece TWB door bone structure illustrated in FIG. 1 only provides limited benefits in door sag and drop-off performance, but does not satisfy all of the requirements.

Specifically, the disclosed three-piece, tailor-welded blank delivers benefits in three major areas. First, it maximizes the overall door system performance in the seven different measurements set forth above (average 70% improvement). Second, it minimizes overall door weight (weight reduction opportunity of two to three pound per door). Third, it reduces design cost (opportunity of eliminating latch re-enforcement and downgrading the center section of inner panel). A comparison study utilizing simulations among three door designs, namely a conventional door, a two-piece tailor-welded blank and the disclosed three-piece tailor-welded blank was conducted. The results shown in the table below confirm that the three-piece, tailor-welded blank outperforms the other two designs.

The results are summarized in the table below:

|  | Drop Off @ Belt-line | Sag Def @ Belt-line | Win Rig @ Rear | Win Rig @ Front | Torsion @ Belt-line | Torsion @ Tip | Torsion @ Bottom |
|---|---|---|---|---|---|---|---|
| Conventional (without TWB) | 1.204 mm | 9.797 mm | 3.445 mm | 3.286 mm | 0.4476 mm | 3.627 mm | 2.106 mm |
| Two Piece TWB | 0.4085 mm (−76%) | 2.983 mm (−70%) | 3.030 mm (−12%) | 1.921 mm (−42%) | 0.3379 mm (−25%) | 2.454 mm (−33%) | 0.6799 mm (−68%) |
| Three Piece TWB | 0.4566 mm (−73%) | 3.013 mm (−70%) | 1.073 mm (−79%) | 1.485 mm (−55%) | 0.1178 mm (−71%) | 1.057 mm (−71%) | 0.7705 mm (−64%) |

Having now fully described the invention, it will be apparent to one of ordinary skill in the art that many changes and modifications can be made thereto without departing from the spirit or scope of the invention as set forth herein.

What is claimed is:

1. A vehicle door structure having at least one door hinge and at least one door latch, comprising:
    a periphery defined by a bottom portion, a pair of opposing side portions extending generally upward from said bottom portion, a top portion, and an inclined portion extending from a top of one of said side portions to an end of said top portion;
    a first thicker gage sheet material portion extending generally upward from said bottom portion, said first thicker gage sheet material portion encompassing the one of said side portions to which said at least one door hinge is attached;
    a second thicker gage sheet material portion extending generally upward from said bottom portion, said second thicker gage sheet material portion encompassing the other of said side portions which is adjacent said at least one door latch; and
    a thinner gage sheet material portion disposed between said first thicker gage sheet material portion and said second thicker gage sheet material portion;
    whereby the overall weight of the vehicle door structure is reduced.

2. The vehicle door structure of claim 1, wherein said first thicker gage sheet material portion also covers a portion of said inclined portion.

3. The vehicle door structure of claim 1, further comprising:
    a window portion having a window frame including a forward frame portion and a rearward frame portion.

4. The vehicle door structure of claim 3, wherein said first thicker gage sheet material covers an area extending between said inclined portion and said forward frame portion.

5. The vehicle door structure of claim 3, wherein said first thicker gage sheet material portion extends inwardly away from said periphery to a downwardly projecting line defined by said forward frame portion.

6. The vehicle door structure of claim 3, wherein said second thicker gage sheet material portion extends from said bottom portion to said top portion.

7. The vehicle door structure of claim 3, wherein said second thicker gage sheet material portion covers at least a portion of said top portion.

8. The vehicle door structure of claim 3, wherein said second thicker gage sheet material portion extends inwardly away from said periphery to an angled line beginning adjacent said rearward frame portion and extending downwardly and angled away from said other of said side portions.

9. The vehicle door structure of claim 3, wherein a majority of all areas of sensitivity resulting from said at least one hinge and said at least one latch are covered by either said first or second thicker gage sheet material.

10. The vehicle door structure of claim 3, wherein substantially all areas of sensitivity resulting from said at least one hinge and said at least one latch are covered by either said first or second thicker gage sheet material.

11. A method of forming a lighter vehicle door through three-piece tailor-welded blank forming, comprising:
    determining a bone structure for a vehicle door;
    locating a first thicker gage sheet material such that it is positioned to cover the bone structure caused by a door hinge;
    locating a second thicker gage sheet material such that it is positioned to cover the bone structure caused by a door latch; and
    locating a thinner gage sheet material between said first thicker gage sheet material and said second thicker gage sheet material.

12. The method of claim 11 further comprising:
    joining said first thicker gage sheet material to one side of said thinner gage sheet material; and
    joining said second thicker gage sheet material to the other side of said thinner gage sheet material.

13. The method of claim 12, wherein said first thicker gage sheet material extends between a peripheral side of the door and a downwardly projecting line formed by a forward window frame portion.

14. The method of claim 12, wherein said second thicker gage sheet material extends from a top portion of the door to a bottom portion.

15. A vehicle door structure comprising:
- a plurality of door hinges located on a first side portion of the door;
- a door latch located adjacent a second side portion of the door;
- a top door window portion and a bottom panel portion;
- a first thicker gage sheet material portion disposed on said first side portion to cover a majority of any bone structure due to said plurality of hinges;
- a second thicker gage sheet material portion disposed on said second side portion to cover a majority of any bone structure due to said door latch; and
- a thinner gage sheet material disposed between said first thicker gage sheet material and said second thicker gage sheet material.

16. The vehicle door structure of claim 15, wherein said first and second thicker gage sheet material portions cover at least 90% of any bone structure.

17. The vehicle door structure of claim 15, wherein said first and second thicker gage sheet material portions cover substantially all of said bone structures.

18. The vehicle door structure of claim 15, wherein said first thicker gage sheet material portion covers an area extending between a peripheral side of the door and a forward window frame portion.

19. The vehicle door structure of claim 15, wherein said first thicker gage sheet material portion extends inwardly from said side portion to a line defined by said forward window frame portion.

20. The vehicle door structure of claim 15, wherein the second thicker gage sheet material portion extends from a top surface of the door to a bottom surface.

* * * * *